(12) United States Patent
Li

(10) Patent No.: US 7,355,977 B1
(45) Date of Patent: Apr. 8, 2008

(54) METHOD AND SYSTEM FOR A WEIGHTED ALLOCATION TABLE

(75) Inventor: Ning Xiang Li, Sequim, WA (US)

(73) Assignee: F5 Networks, Inc., Seattle, WA (US)

( * ) Notice: Subject to any disclaimer, the term of this patent is extended or adjusted under 35 U.S.C. 154(b) by 1107 days.

(21) Appl. No.: 10/222,108

(22) Filed: Aug. 16, 2002

(51) Int. Cl.
*H04L 12/26* (2006.01)

(52) U.S. Cl. .................................. 370/235.1

(58) Field of Classification Search ..... 370/229–230.1, 370/235, 235.1, 237, 238, 252, 351, 412; 709/238, 240, 241, 242
See application file for complete search history.

(56) References Cited

U.S. PATENT DOCUMENTS 6,067,547 A * 5/2000 Douceur ................. 707/100

7,050,392 B2 * 5/2006 Valdevit ................. 370/228

* cited by examiner

*Primary Examiner*—Doris H. To
*Assistant Examiner*—Kerri M. Rose
(74) *Attorney, Agent, or Firm*—Darby & Darby PC; John W. Branch

(57) ABSTRACT

A method and system for creating and maintaining an allocation table that associates allocation buckets with corresponding target identifiers. Each target identifier has a corresponding weighting value. The allocation table has a number of allocation buckets, each associated with a target identifier. When one or more weighting values change, one or more buckets are reassigned to different target identifiers. A number of factors are considered in determining whether to delay modification of the allocation table, in order to further reduce disruption. The allocation table may be used to distribute packets among network devices, or more generally, to route packets along paths in a network.

37 Claims, 12 Drawing Sheets

908

For each target Ti having new weight Wi.new, compute number of buckets Bi.new to be approximately
(Wi.new/Wt.new) X N — 1002

For each target, compute change in number of buckets
Bi.delta = Bi.new - Bi.old $$\text{disruption} = \frac{\Sigma |Bi.delta|}{2 \times n}$$

METHOD AND SYSTEM FOR A WEIGHTED ALLOCATION TABLE

FIELD OF THE INVENTION

The present invention relates generally to computer data structures and algorithms, and, more specifically, to the storage and updating of data using an allocation table.

BACKGROUND

When devices on a network communicate with each other, they communicate by sending packets of data back and forth. Each packet typically follows a communication path in which there are a series of intermediate network nodes. In a network made up of smaller networks, such as the Internet, packets of data are received by routers and forwarded to the next network node on its way to its ultimate destination. A router is connected to two or more networks, and, for each packet, makes decisions as to the next hop in the path of the packet. A router typically has information about available paths, and uses a routing algorithm to decide the next network node for each packet. Often, there are a number of available paths that packets can take between a source and a destination.

A communication includes all packets exchanged between network nodes during a transaction. This includes protocol handshakes that are specified by a particular protocol, such as TCP/IP, and SSL/TLS. A transaction may be a request of data from a client to a server, together with the response by the server. A request for a web page and the transmission of the web page is one type of communication. A request to download a file and the transfer of the file is another type of communication. A communication or part of a communication may also be referred to as a flow or as a flow of packets.

Some protocols, such as TCP/IP, perform best if the network path of a communication does not change during the communication. If a path changes, the protocol may be broken, and the communication may be terminated prematurely. A change in path causes disruption on a flow. Disruption may refer to a measurement of the number of flows that have their paths changed. One way to measure disruption is as a percentage of total flows that are disrupted. Using this metric, disruption at a network device such as a router is the percentage of flows through the device that have their paths changed. Disruption is discussed in Request for Comments 2291 and Request for Comments 2292, available at http://www.ietf.org/rfc/rfc2991.txt, and http://www.ietf.org/rfc/rfc2992.txt, respectfully.

A special case of changing a network path occurs when a client communicates with a server, and the communication is redirected to a different server. For example, a web site may use a number of servers to provide information and perform transactions. A client may begin a transaction with a particular server, which stores information relating to the client or the transaction. The communication may then be redirected by an intermediate device, such as a traffic manager, to a different server. The second server may not be able to complete the transaction, because it is lacking important data. For example, when a user is shopping for items on a WWW server and filling a "shopping cart," a traffic management device that sends some packets from the user to one WWW server and other packets from the user to another WWW server may cause shopping cart information to be lost. A change in servers such as this is also referred to as disruption. It is to be noted that a transaction that is disrupted because application data is not accessible is different than a broken TCP/IP protocol. However, both situations are referred to as disruption, in this application.

What is needed is a way of manipulating a mapping between source objects, such as packets, and targets, so that when the targets change, the mapping can be modified, without an excessive amount of disruption.

SUMMARY

In accordance with the present invention, there is provided a method and system for creating and maintaining an allocation table associating allocation buckets with corresponding target identifiers, each target identifier having a corresponding weighting value, such that the set of target identifiers has a distribution profile based on weighting values of each target identifier.

In one aspect of the invention, an allocation table having a number of allocation buckets is created. Each allocation bucket has an association with a corresponding target identifier, based on the distribution profile.

In another aspect of the invention, if a weighting value corresponding to one or more target identifiers changes, a new bucket allocation profile is determined based on the changed weighting value changes, and at least one association corresponding to at least one allocation bucket is modified, based on the new bucket allocation profile.

In another aspect of the invention, prior to creating the associations, a first bucket allocation profile is determined based on the distribution profile, such that the bucket allocation profile indicates a number of buckets corresponding to each of the target identifiers, and only associations corresponding to allocation buckets that are assigned to target identifiers having a decrease in the corresponding number of buckets from the first bucket allocation profile are modified. A decrease is measured by subtracting the new bucket allocation profile from the first bucket allocation profile.

In another aspect of the invention, associations of allocation buckets are changed based on the new bucket allocation profile and the first bucket allocation profile. The assignment of buckets prior to the changes can also be used.

In another aspect of the invention, for each target identifier, a number of buckets approximately equal to the decrease in the corresponding number of buckets are modified.

In another aspect of the invention, allocation buckets that are assigned to a target identifier may include buckets that are not contiguous with the remaining buckets assigned to the same target identifier. This may occur at the initial creation of the allocation table, or after any modification of the allocation table.

In another aspect of the invention, if the total weighting value of all target identifiers does not increase, only associations of allocation buckets associated with target identifiers having a decrease in weighting value are modified.

In another aspect of the invention, the allocation table and associated methods are used to route packets along paths in a network, where each path has a weighting value. A hash is performed on one or more characteristics of each packet to determine an allocation bucket, which is used to determine a path for the packet.

In another aspect of the invention, the allocation table and associated methods are used to distribute packets to network devices, where each network devices has a weighting value. A hash is performed on one or more characteristics of each packet to determine an allocation bucket, which is used to determine a target network device for the packet.

In another aspect of the invention, if a weighting value changes, a determination is made as to whether to wait prior to modifying the allocation table. The determination can be made based on a number of factors, including the magnitude and direction of change in weighting value, the amount of network traffic, the optimal weighting value for each target identifier, changes in bucket allocation profile, and combined weighting value changes since the previous table modification.

These and various other features as well as advantages, which characterize the present invention, will be apparent from a reading of the following detailed description and a review of the associated drawings.

BRIEF DESCRIPTION OF THE DRAWINGS

FIG. 10 is a flow chart illustrating, in further detail, the process of FIG. 9;

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined by the appended claims. The phrase "in one embodiment" as used herein does not necessarily refer to the same embodiment, though it may. As used herein, the term "or" is an inclusive "or" operator, and is equivalent to the term "and/or", unless the context clearly dictates otherwise.

Throughout the specification and claims, the following terms take the meanings explicitly associated herein, unless the context clearly dictates otherwise.

The term "packet" refers to an arbitrary or selectable amount of data that may be represented by a sequence of one or more bits. A packet may correspond to a data unit found in any layer of the OSI model, such as a segment, message, packet, datagram, frame, symbol stream, or stream, a combination of data units found in the OSI model, or a non OSI data unit.

Generally, the phrase "computer-readable media" includes any media that can be accessed by a computing device. Computer-readable media may include computer storage media, communication media, or any combination thereof.

The phrase "communication media" typically embodies computer-readable instructions, data structures, program modules, or other data in a modulated data signal such as a carrier wave or other transport mechanism and includes any information delivery media. By way of example, communication media includes wired media such as twisted pair, coaxial cable, fiber optics, wave guides, and other wired media and wireless media such as acoustic, RF, infrared, and other wireless media.

The term "modulated data signal" means a signal that has one or more of its characteristics set or changed in such a manner as to encode information in the signal.

The term "based on" is not exclusive and allows for being based on additional factors not described, unless the context clearly dictates otherwise.

Figure 1:
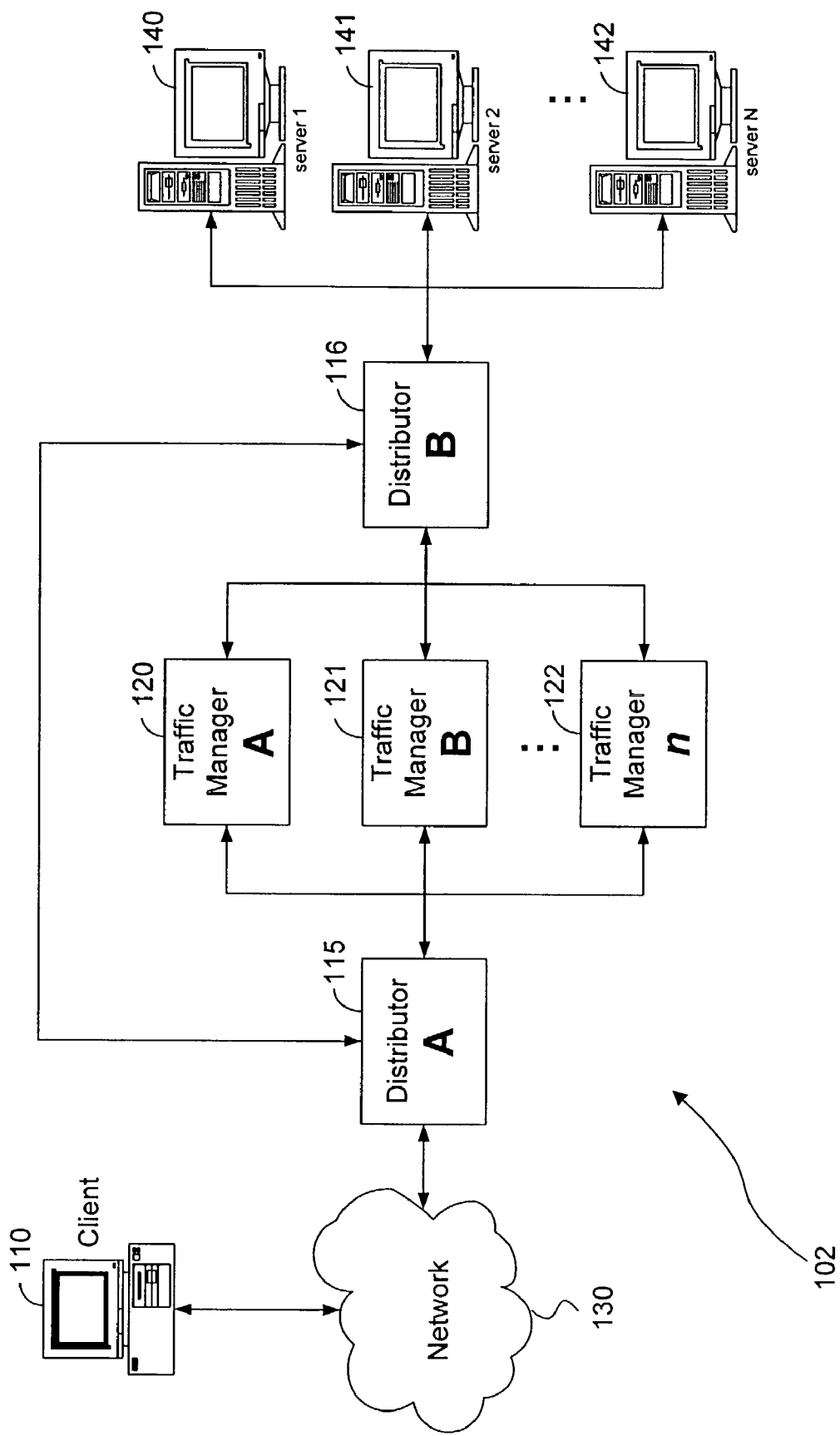
FIG. 1 is a system diagram of a computer network in which the invention may be practiced.

FIG. 1 illustrates an exemplary environment in which a system 102 for distributing traffic operates, according to one embodiment of the invention. FIG. 1 includes a network 130. The network 130 may be a wide area network (WAN), a local area network (LAN), or a combination of interconnected WANs and LANs. The Internet is made up of a vast number of such interconnected networks, computers, and routers that use the Transmission Control Protocol/Internet Protocol ("TCP/IP") suite of protocols to communicate with one another. Routers are intermediary devices on a communications network that expedite packet delivery. On a single network linking many computers through a mesh of possible connections, a router receives transmitted packets and forwards them to their correct destinations over available routes. On an interconnected set of LANs—including those based on differing architectures and protocols—a router acts as a link between LANs, enabling packets to be sent from one to another. Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links. In one embodiment, the invention is practiced by intermediate network devices such as routers on a network such as the Internet. In one embodiment, the invention is practiced by intermediate network devices within a LAN.

FIG. 1 shows traffic distribution over a number of paths, distribution among a number of target intermediate devices, and distribution among a number of target servers. The system 102 includes client 110, distributor A 115, distributor B 116, traffic management devices 120-122, and origin servers 140-142.

Origin servers 140-142, also called, simply "servers," are computing devices that provide information and/or services to clients, such as client 110. Servers may, for example, provide web pages or components thereof, store data and/or files for access by other servers or clients, or any combination of these functions. Each distributor 115-116 and traffic management device 120-122 may be a network device such as network device 200 of FIG. 2.

Client 110 is coupled to distributor A 115 over a network 130. Distributor A 115 is coupled to distributor B 116 through traffic management devices 120-122. Distributor A 115 also has a more direct connection to distributor B 416. Distributor B 416 is coupled to origin servers 140-142.

Distributors 115-116 receive information in the form of packets. Each packet conveys a piece of information. A packet may be sent as part of a handshake protocol, as part of a request for data, or as part of transmitted data.

A packet may come from various network devices including client 110, traffic management devices 120-122, distributor B 116 or origin servers 140-142. Generally, packets received by distributors 115-116 are formatted according to the TCP/IP protocol, but they could also be formatted using another transport protocol, such as User Datagram Protocol (UDP), Internet Control Message Protocol (ICMP), NETbeui, IPX/SPX, token ring, and the like. Upon receipt of a packet, logic associated with distributor A 115 determines where the packet should go. The logic may be performed by logic circuitry or software executing on the electronic device upon which distributor A 115 resides. It may be integrated with distributor A 115 or it may execute or reside elsewhere.

For example, a user on client 110 may be requesting a Web page associated with a URL, such as www.uspto.gov. If this is a Web page that is serviced by origin servers 140-142, distributor A 115 forwards the request to one of traffic management devices 120-122. The traffic management device then forwards the request to one of the origin servers 140-142.

When requests for content come to distributor A 115, distributor A 115 may be required to ensure that a subsequent request from the same source is sent through the same traffic management device. The traffic management device may maintain state information, among other things, about connections between origin servers 140-142 and requestors, such as client 110.

In one embodiment, the distributor A 115 uses an allocation table for forwarding packets directed to traffic management devices 120-122. In one embodiment, the traffic management device 120-122 uses an allocation table for forwarding packets to a server 140-142. The use of allocation tables is described in more detail below.

Similarly distributor B 116 receives communications and forwards them to one or more of server 140-142, to distributor A 115, or to traffic management devices 120-122. During a flow of packets, it may be desirable for distributor A 115 and distributor B 116 to forward packets consistently through the same traffic management device. For example, when packets are coming from a client device, distributor A 115 may maintain an allocation table in accordance with the present invention, and hash on the client address as part of determining an intermediary traffic manager 120-22. When packets are coming from a server 140-142 to the client, distributor B 116 may hash on the client (destination) address and employ the same or an identical allocation table to determine the same intermediary traffic manager, thereby insuring that all packets within a flow pass through the same intermediary device. Distributor A 115 and distributor B 116 may use a number of techniques to insure that they are using identical allocation tables. They may, for example, share data whenever a table is updated. They may use a single table that they both have access to. The functions of both distributors may be combined on one network device, where a single allocation table is maintained.

Traffic management devices 120-122 receive packets from network 130, through the distributors 115 and 116, and also receive packets from the servers 140-142. In some operations, traffic management device 120-122 acts like a layer 7 switch. That is, it may look at content associated with higher TCP/IP layers of the packet, e.g. a request for an HTML page, the request including a Uniform Resource Locator (URL) and information that identifies the user, such as a cookie, etc. It may store information in memory so that next time the requestor requests more information from the same web site each request is sent to the same server. This helps prevent the loss of transaction data, such as items in a shopping cart.

Traffic management devices, such as traffic management devices 120-122, are any devices that manage network traffic. Such devices include, for example, routers, proxies, firewalls, load balancers, devices that perform network address translation, any combination of the preceding devices, and the like. In one embodiment, as illustrated in FIG. 1, a traffic manager controls the flow of data packets delivered to and forwarded from an array of origin servers 140-142. A traffic manager may direct a request for a resource to a particular Web server based on network traffic, network topology, capacity of the server, content requested, and a host of other load balancing metrics. A traffic manager may receive data packets from and transmit data packets to the Internet, an intranet, or a local area network accessible through another network.

Although distributor B 116 is shown as having one shared communications link (segment) going between it and origin servers 140-142, it may have dedicated communications links to each of origin servers 140-142.

The components illustrated in FIG. 1 may be configured in a variety of ways. In one variation, for example, a single distributor performs the functions of both the distributor A 115 and the distributor B 116. This single distributor may have connections with the network 130, the traffic managers 120-122, and the servers 140-142, and act as an intermediary in one or both directions between the WAN and the traffic managers, the traffic managers and the servers, and the WAN and the servers. The traffic managers, the servers, and other components of FIG. 1 may also be configured in a variety of ways, in accordance with the present invention.

Figure 2:
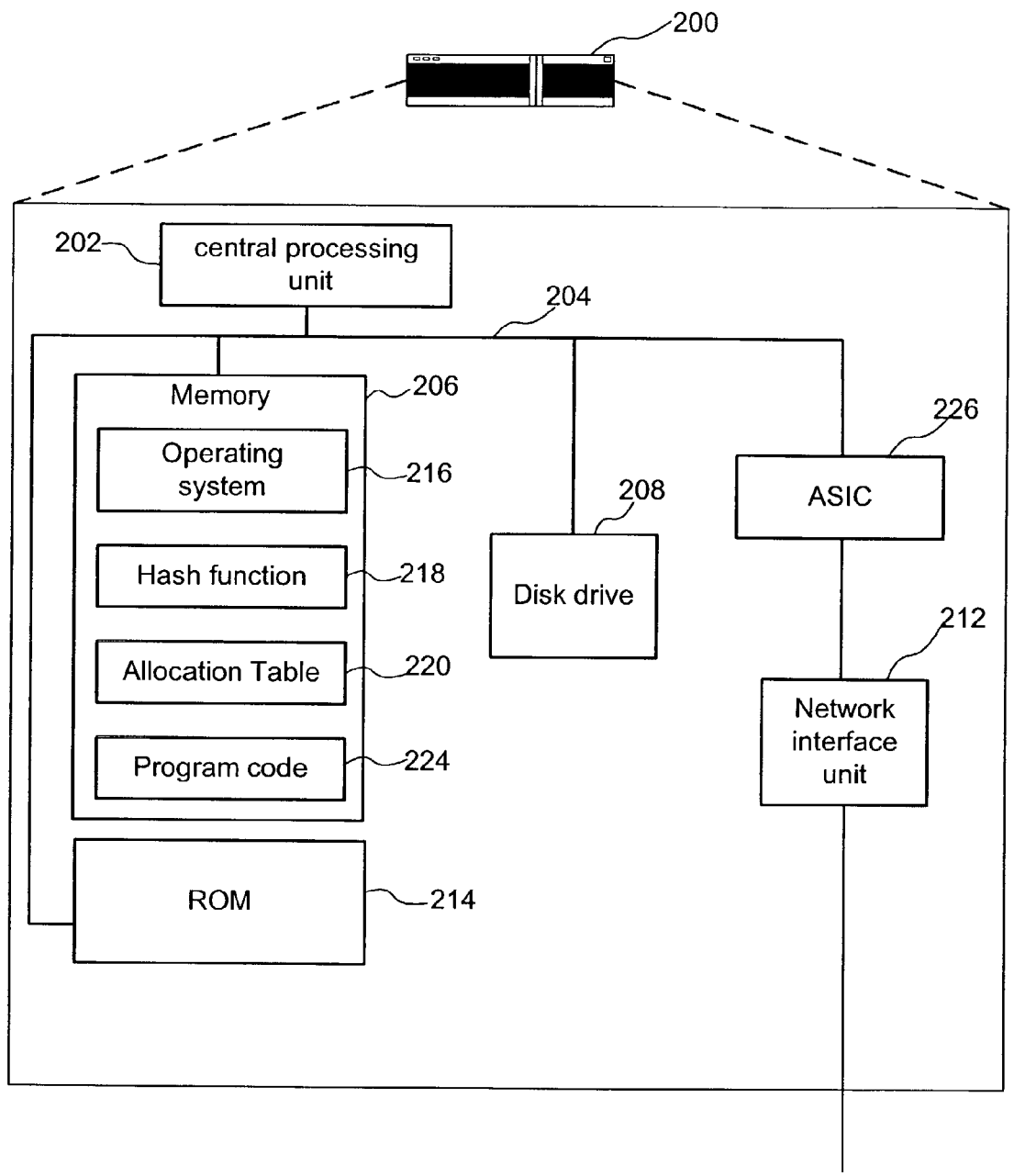
FIG. 2 is a block diagram of an exemplary network device that may be employed to perform the invention.

FIG. 2 shows an exemplary network device 200 that may operate as an intermediate network device in accordance with the present invention. It will be appreciated that not all components of network device 200 are illustrated, and that network device 200 may include more or fewer components than those shown in FIG. 2. Network device 200 may operate, for example, as a router, bridge, firewall, gateway, traffic management device (also referred to as a traffic manager), distributor, load balancer, server array controller, or proxy server. The communications may take place over the network 130, the Internet, a WAN, LAN, or some other communications network known to those skilled in the art.

As illustrated in FIG. 2, network device 200 includes a central processing unit (CPU) 202, mass memory, and a network interface unit 212 connected via a bus 204. Network interface unit 212 includes the necessary circuitry for connecting network device 200 to network 130, and is constructed for use with various communication protocols including the TCP/IP protocol. Network interface unit 212 may include or interface with circuitry and components for transmitting messages and data over a wired and/or wireless communications medium.

The mass memory generally includes random access memory ("RAM") 206, read-only memory ("ROM") 214, and one or more permanent mass storage devices, such as hard disk drive 208. The mass memory stores operating system 216 for controlling the operation of network device 200. The operating system 216 may comprise an operating system such as UNIX, LINUX™, or Windows™.

In one embodiment, the mass memory stores program code and data for implementing a hash function 218, and program code and data for implementing an allocation table 220, in accordance with the present invention. The mass memory may also store additional program code 224 and data for performing the functions of network device 200.

In one embodiment, the network device 200 includes one or more Application Specific Integrated Circuit (ASIC) chips 226 connected to the bus 204. As shown in FIG. 2, the network interface unit 212 may connect to the bus through an ASIC chip. The ASIC chip 226 includes logic that performs some of the functions of network device 200. For example, in one embodiment, the ASIC chip 226 performs a number of packet processing functions, to process incoming packets. In one embodiment, the logic of the hash function 218 is performed by the ASIC chip 226. In one embodiment, the network device 200 includes one or more field-programmable gate arrays (FPGA) (not shown), instead of, or in addition to, the ASIC chip 226. A number of functions of the network device can be performed by the ASIC chip 226, by an FPGA, by the CPU 202 with the logic of program code stored in mass memory, or by a combination of the ASIC chip and the CPU.

Computer storage media may include volatile and nonvolatile, removable and non-removable media implemented in any method or technology for storage of information, such as computer readable instructions, data structures, program modules or other data. Examples of computer storage media include RAM 206, ROM 214, EEPROM, flash memory or other memory technology, CD-ROM, digital versatile disks (DVD) or other optical storage, magnetic cassettes, magnetic tape, magnetic disk storage or other magnetic storage devices, or any other medium that can store the information and that can be accessed by a computing device.

Network device 200 may also include an input/output interface (not shown) for communicating with external devices or users.

Network device 200 can also be implemented as one or more "blades" where the term "blade" refers to one of multiple electronic circuit boards or cards that are installed in a hardware chassis with a backplane. An exemplary blade may include one or more processors, volatile and nonvolatile memory, interfaces suitable for communicating information to and from the blade, and other components for enabling the operation of one or more applications. A blade may also include a specialized interface for the backplane and other interfaces, such as a USB port, FIREWIRE port, serial port, RF interface, IR interface, Ethernet interface, IDE controller, and the like. An application running on a blade may employ any of these interfaces to communicate information to other applications running on other blades and/or devices coupled to the blade server. Network device 200 can also be implemented as a combination of blades and additional components in chassis.

Figure 3:
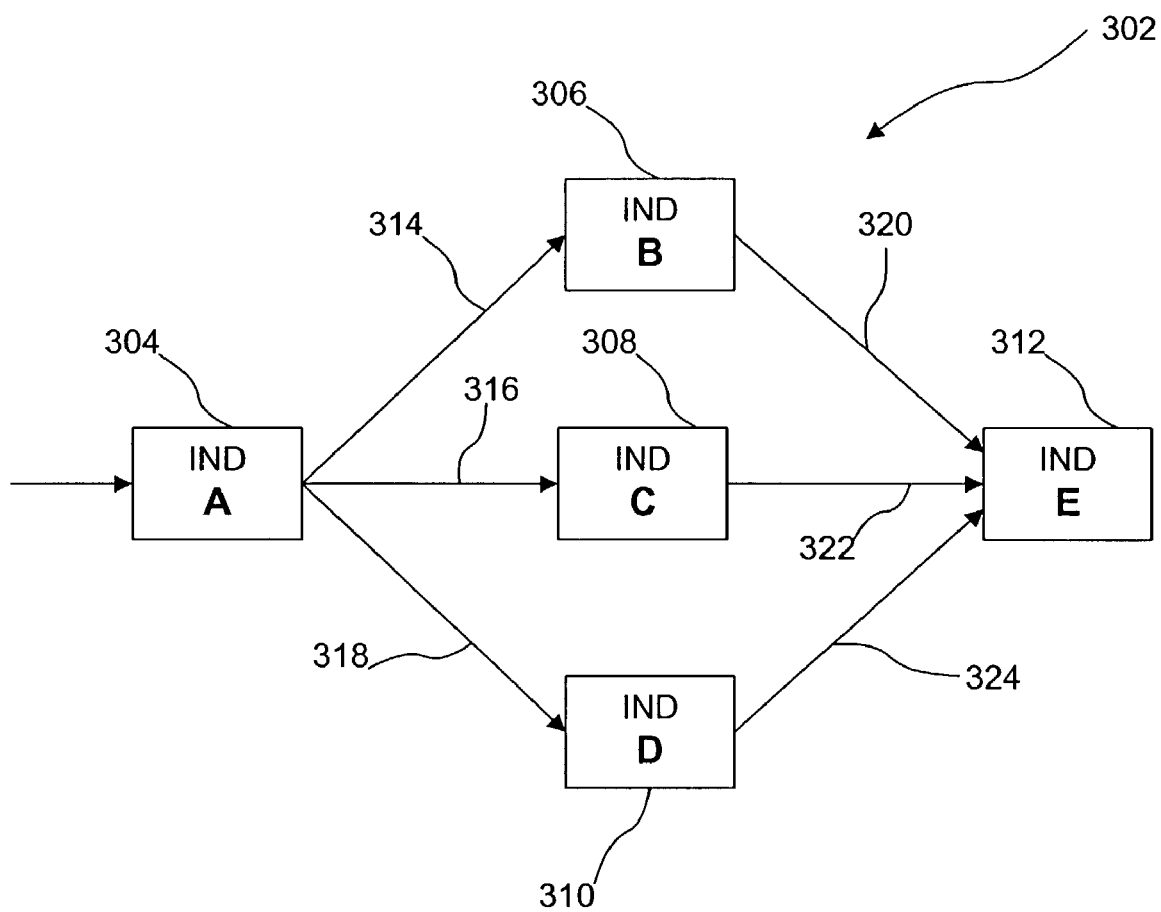
FIG. 3 is a system diagram of a computer network in which the invention may be practiced.

FIG. 3 illustrates an exemplary environment 302 for forwarding packets through a network, such as the Internet. Each network communicates with other networks through one or more intermediate network devices (INDs). FIG. 3 illustrates a number of interconnected intermediate network devices. Each (IND) may be a network device such as network device 200 of FIG. 2. In one embodiment, one or more of the intermediate network devices are routers.

As illustrated in FIG. 3, IND A 304 communicates directly with IND B 306, IND C 308, and IND D 310, via path AB 314, path AC 316, and path AD 318, respectively. INDs B, C, and D each communicate directly with IND E 312 directly via path BE 320, path CE 322, and path DE 324, respectively. IND A communicates with IND E via one of three different combinations of paths, using one of intermediate INDs B, D, and E. Path ABE, for example, is made up of path AB and path BE. Path ACE is made up of path AC and path CE, while path ADE is made up of path AD and path DE. Each of the paths has an associated weighting value. The terms "cost" and "weighting value" are inversely related. That is, the higher the cost of a path, the lower is the path's weighting value.

When an IND, such as IND A 304 receives a packet that is to be sent to destination IND E or beyond, the IND makes a decision as to which path to send the packet. In accordance with the present invention, the IND uses an allocation table and a hash function to hash on characteristics of the incoming data packet in order to determine the next hop, or outgoing path. Further, the selection of paths is weighted, so that the number of packets is approximately proportional to the weighting value for the path. As discussed below, the present invention may be employed in an IND to maintain an allocation table providing information for forwarding packets along paths of the network.

In one embodiment, the characteristics of the data packet are selected so that they remain constant for all packets within a flow of packets. For example, selecting the sum, or concatenation, of (source address, destination address) from the packet header field, as the input to a hash function, results in a constant value for all packets sent between two nodes. If constancy is only needed for packets traveling in one direction (as might be the case in a traffic manager distributing traffic to a set of servers), using the source address alone would be sufficient. The characteristics that are hashed on can exist in any of a number of layers. For example, fields in a layer two header, such as Ethernet MAC addresses (source and/or destination) and VLAN ID can be used. Fields in a layer three header, such as IP source and destination addresses can be used. Fields in layer four headers, such as TCP or UDP ports, both source and destination, can be used. The above characteristics are merely exemplary, and not limiting, of the characteristics that can be hashed on with the present invention.

As discussed above, FIG. 3 illustrates a system in which a network router employs the present invention to distribute packets among paths of the network. FIG. 1 illustrates a system in which a network device, such as a distributor, distributes packets among target intermediate devices, such as traffic managers. It also illustrates a system in which a network device, such as a traffic manager distributes packets among target devices, such as origin servers. Target devices may also include devices such as caches, SSL proxies, proxy servers, and firewalls. As used herein, selecting a target device is a specific case of the more generalized action of selecting a network path, and statements referring to selecting a network path include selection of a target device, unless the context clearly indicates otherwise. Generally, the foregoing description of the invention as pertaining to target devices is considered exemplary of use of the invention for selecting network paths, unless the context clearly indicates otherwise.

Figure 4:
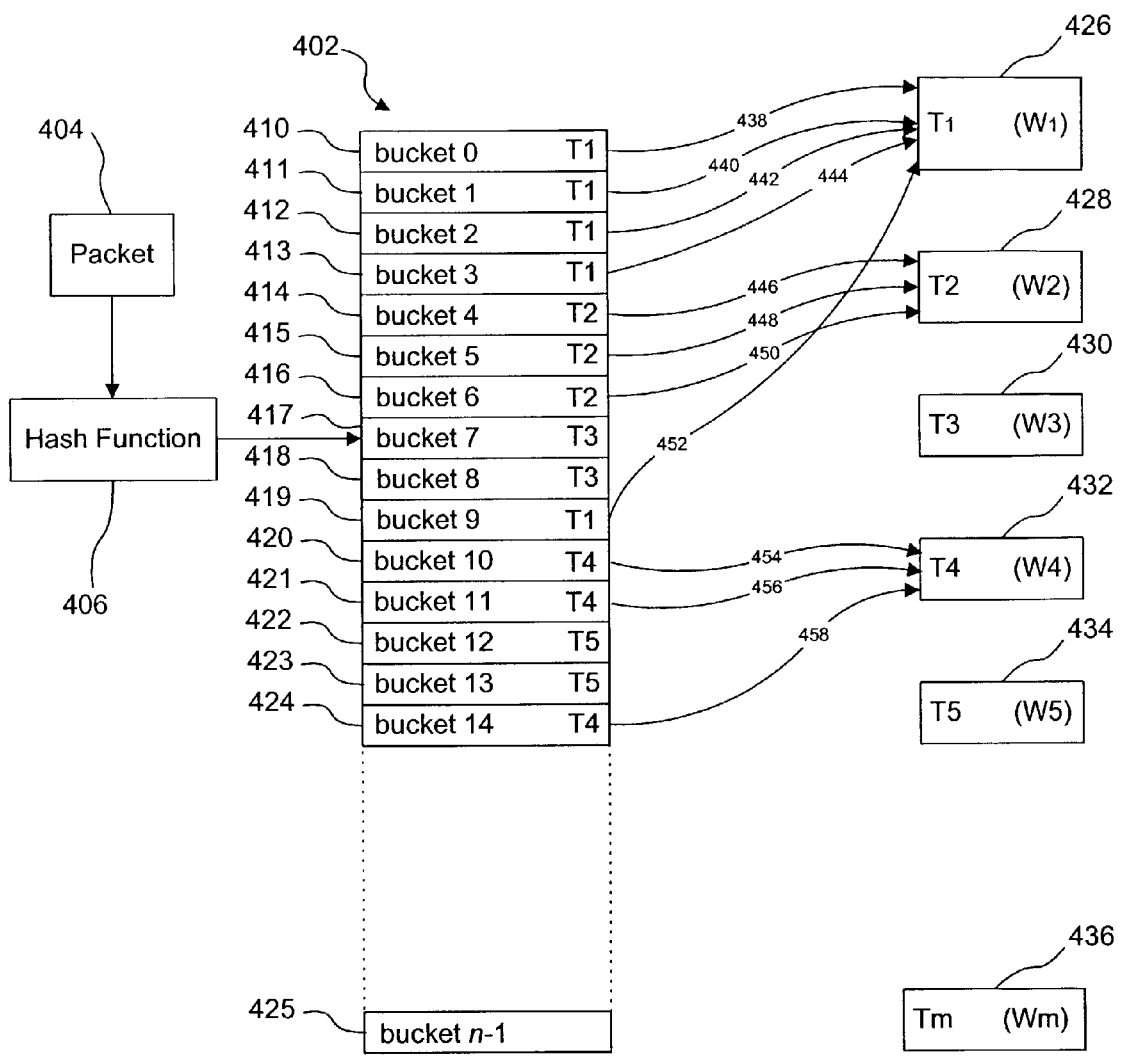
FIG. 4 illustrates an allocation table employing the present invention.

FIG. 4 illustrates an exemplary allocation table 402 in accordance with an embodiment of the present invention. As illustrated in FIG. 4, the allocation table 402 contains a number n of allocation buckets 410-425. As further illustrated in FIG. 4, a packet 404 is received by a network device practicing the invention. One or more characteristic values of the packet 404 are used as input to a hash function 406, which results in an allocation bucket identifier, also referred to as an allocation bucket index. In the example of FIG. 4, the bucket index is a value from 0 to n−1.

The hash function 406 can be one of a variety of hash functions. A hash is a function or algorithm that maps a set of input values to a set of output values. Generally, a hash is deterministic. That is, the hash function produces the same output value whenever a particular input value is hashed on. In one embodiment, a hash function is employed that produces uniform distribution of allocation buckets for the set of input values. MD5 and SHA are two well-known standard hash functions that may be used. The allocation bucket index produced by the hash function matches the packet to an allocation bucket 410-425 in the allocation table 402. For example, an allocation table with n buckets may be used with a hash function that performs calculations modulo n, in order to produce a value between 0 and n−1 inclusive. In one embodiment, the allocation table 402 has a number n of buckets 410-425 equal to a power of 2, such that $2^m=n$, and the hash function produces a value m bits long. Each resultant bucket index matches one allocation bucket 410-425.

Each allocation bucket 410-425 has an associated target identifier. As illustrated in FIG. 4, a number of targets 426-436 each have a corresponding target identifier. Each allocation bucket 410-425 is used to determine a target identifier that specifies one of the targets 426-436. The targets can represent network devices, network paths, processors, or other physical objects. The targets, and their corresponding target identifiers, may also represent logical objects, such as data structures, instances of software classes, or units of data. In one embodiment, the number of targets 426-436 is less than the number of allocation buckets to allow for each target having one or more associated allocation buckets. In one embodiment, the number of allocation buckets is much greater than the number of targets, such as on the order of thousands of times as many allocation buckets as targets.

In one embodiment, the allocation table 402 is implemented as a table data structure, wherein each allocation bucket is an entry in the table, and each entry contains an identifier of a target. These structures and identifiers can be implemented in a number of ways, in accordance with the practice of the present invention. As used herein, the term table represents any combination of data structure and associated programming logic that allows storage and retrieval of mappings between values.

As illustrated in the exemplary allocation table 402, target 1 (426) has five allocation buckets associated with it: bucket 0 (410), bucket 1 (411), bucket 2 (412), bucket 3 (413), and bucket 9 (419). The associations are illustrated by arrows 438, 440, 442, 444, and 452, respectively. It is to be noted that bucket 9 (419) is not contiguous with the other buckets associated with target 1 (426). The present invention allows noncontiguous buckets to be associated with a target.

As further illustrated in FIG. 4, target 2 (428) has three allocation buckets associated with it: bucket 4 (414), bucket 5 (415), and bucket 6 (416). These associations are illustrated by arrows 446, 448, and 450, respectively. Target 3 (430) has two allocation buckets associated with it: bucket 7 (417) and bucket 8 (418). Target 4 has three allocation buckets associated with it: bucket 10 (420), bucket 11 (421), and bucket 14 (424). The associations of target 4 (432) are illustrated by arrows 454, 456, and 458, respectively. It is to be noted that bucket 14 (424) is not contiguous with the other buckets associated with target 4. Target 5 has two allocation buckets associated with it: bucket 12 (422) and bucket 13 (423). Some arrows, targets, and allocation buckets are not shown in FIG. 4, in order to simplify the figure.

When employed to distribute network traffic, the allocation table 402 is also referred to as a traffic allocation table (TAT), and the targets 426-436 may be referred to as destination targets. When packet values are hashed by the hash function 406, producing a hash index that identifies an allocation bucket 410-425, the destination target associated with the allocation bucket is used to forward the packet. In one embodiment, a uniform hash function causes each allocation bucket to be accessed approximately uniformly. Therefore, the number of allocation buckets associated with a destination target determines the amount of packet traffic distributed to the target.

Each target 426-436 has a corresponding weighting value. The weighting value is a characteristic of a target that may represent one of a number of possible characteristics or combinations of characteristics. In one embodiment, the weighting value represents a number of packets that the target can process in a certain amount of time. In one embodiment, the weighting value represents one or more computing capabilities of a target device. In one embodiment, the weighting value represents the inverse of a cost of directing a packet to the target, where the cost may represent one or more factors. In one embodiment, weighting value is determined by a formula based on one or more characteristics. In one embodiment, one or more real time measurements are taken in order to determine the weighting value of a target.

The weighting value of each target 426-436 is used to determine the number of allocation buckets 410-425 that are associated with each target. In general, targets having higher weighting values have more allocation buckets, and therefore receive more packets, over a certain time period, than targets having lower weighting values. The structures and actions described herein therefore provide a weighted distribution algorithm.

Figure 5:
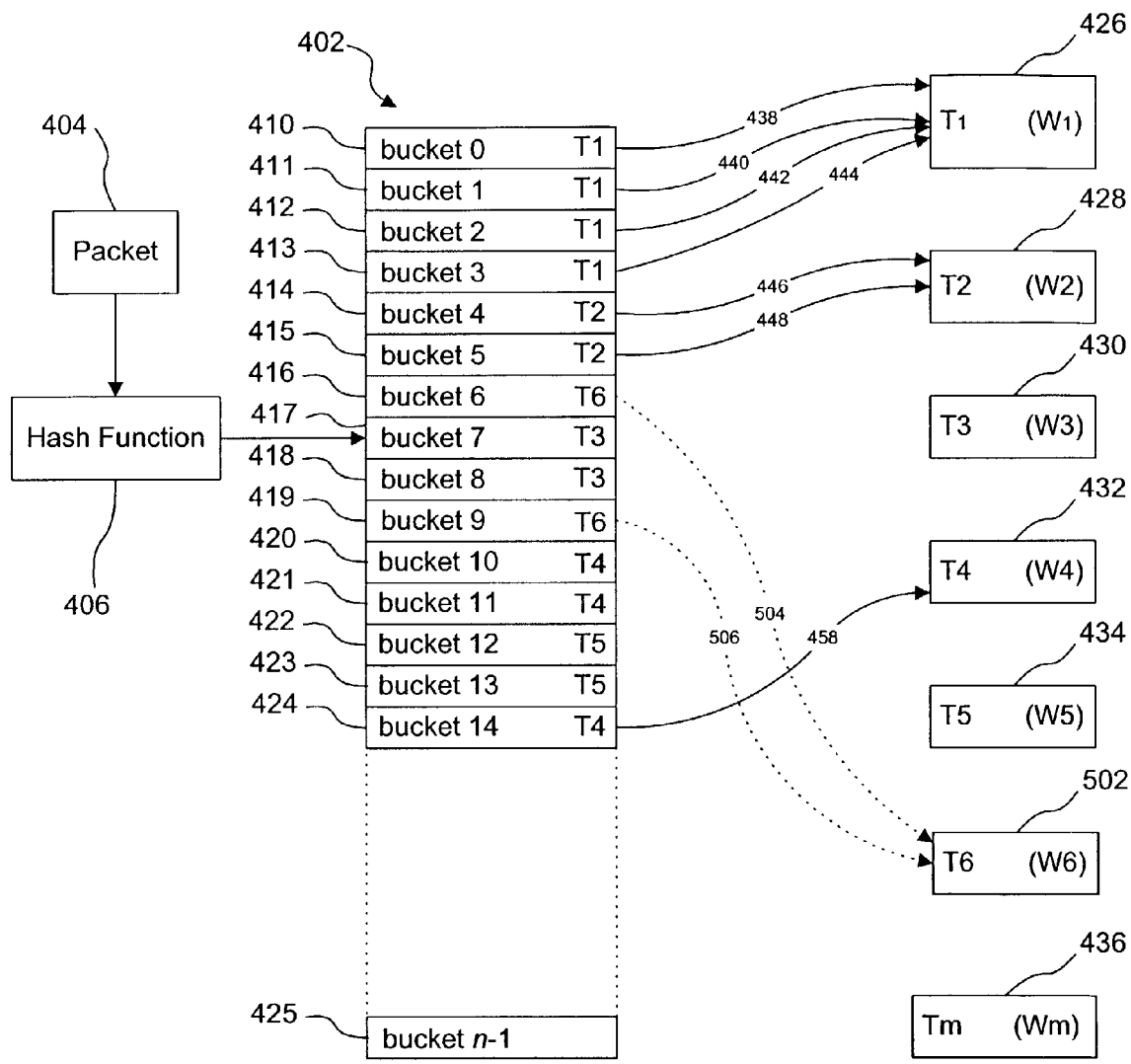
FIG. 5 illustrates the allocation table of FIG. 4 after a target has been added to the set of targets.

FIG. 5 illustrates the allocation table 402 after a new target 6 (502) is added, and the allocation table is modified in accordance with the present invention. When a new target is added, is can be considered equivalent to increasing the weighting value of a target from zero to a non-zero number. Similarly, when a target is deleted, it can be considered equivalent to decreasing the weighting value of a target to zero.

For purposes of discussing FIG. 5, it is assumed that after the new target 6 (502) is added, aspects of the invention are employed to determine that two allocation buckets should be assigned to target 6, and that one of these allocation buckets should be reassigned from target 1 (426) and one of the allocation buckets should be reassigned from target 2 (428). A discussion of how these determinations are made will be provided below.

As illustrated in FIG. 5, by comparison with FIG. 4, allocation bucket 9 (419) is reassigned to point to target 6 (502), the reassignment designated by the dotted arrow 506. Also, allocation bucket 6 (416) is reassigned to point to target 6, as designated by the dotted arrow 504. As used herein, an allocation bucket "pointing" to a target is equivalent to the allocation bucket being assigned to the target.

By comparison between FIGS. 4 and 5, it is shown that in a network device employing the present invention, after target 6 (502) is added, target 1 (426) and target 2 (428) receive a lower percentage of total packets than each target previously did, for the example of these FIGURES. More specifically with an allocation table of n buckets, and a steady packet traffic flow of f packets per second (PPS), there is a flow of approximately f/n PPS for each bucket. Therefore, targets 1 and 2 each receive a reduction of f/n PPS, and target 6 receives a flow of (2×f)/n PPS. In a situation where target 6 already existed, and its weighting value was increased, the change would be similar to that illustrated by FIG. 5, in that one or more allocation buckets would be reassigned from other targets to point to target 6.

When network traffic flow is directed by use of an allocation table, and an allocation bucket is reassigned to a different target, there is a possibility of disruption occurring for communications that use the affected allocation bucket to be directed to a target. Assume that there are a number c of active communication flows that travel through a network device at an instant in time when a change in path is made. Active communication flows, as used here, includes only communication flows that start prior to the instant in time, and continue after the instant in time, so that a change in path causes a disruption. In the worst case, if all paths are changed, there would be a number c of disruptions. The amount of disruption that occurs as a result of reassignments is proportional to the number of allocation buckets that are reassigned, relative to the total number n of allocation buckets in the allocation table. Stated another way, the amount of disruption is approximately (R×c)/n, where R represents the number of allocation buckets that are reassigned. In the example illustrated by FIG. 5, two allocation buckets are reassigned, and the resulting disruption is approximately equal to (2×c)/n.

Figure 6:
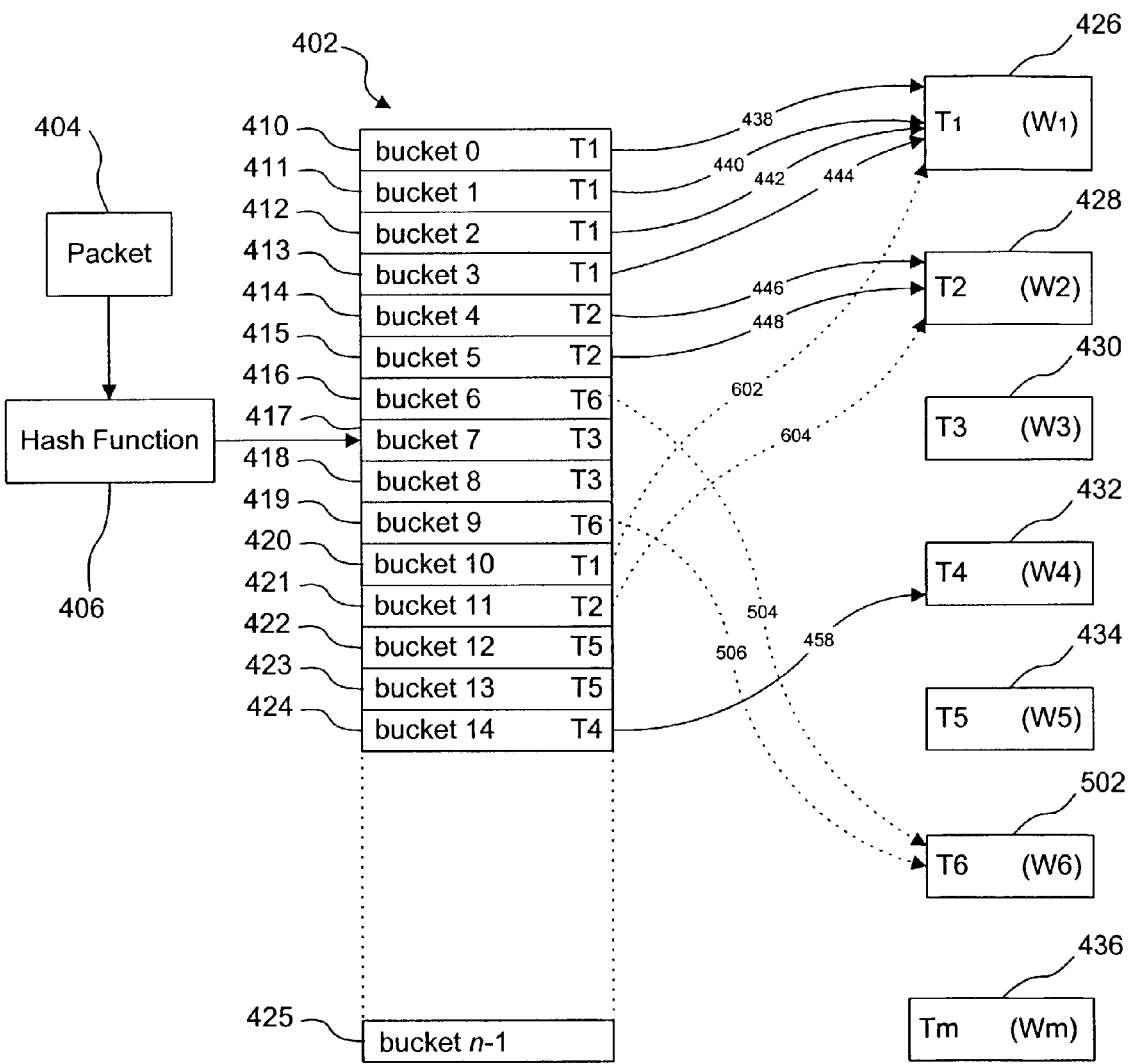
FIG. 6 illustrates the allocation table of FIG. 5 after a target has been deleted from the set of targets.

FIG. 6 illustrates an example wherein the weighting value of target 4 (432) is reduced, and the allocation table 402 of FIG. 5 is modified in accordance with the present invention. When a target is deleted, it can be considered equivalent to decreasing the weighting value of a target to zero, and much of this discussion also applies to an example where target 4 is deleted.

For purposes of discussing FIG. 6, it is assumed that after the weighting value of target 4 (432) is reduced, aspects of the invention are employed to determine that two allocation buckets allocation bucket 10 (420) and allocation bucket 11 (421) should be reassigned from target 4. More specifically it is assumed that one allocation bucket is to be reassigned to target 1 (426) and one allocation bucket is to be reassigned to target 2 (428), leaving one allocation bucket assigned to target 4. A discussion of how these determinations are made will be provided below.

As illustrated in FIG. 6, by comparison with FIG. 5, allocation bucket 10 (420) is reassigned to point to target 1 (426), the reassignment designated by the dotted arrow 602. Also, allocation bucket 11 (421) is reassigned to point to target 2, as designated by the dotted arrow 604. Allocation bucket 14 (424) is left unchanged, pointing to target 4.

By comparison of FIGS. 5 and 6, it is shown that in a network device employing the present invention, after the weighting value of target 4 (432) is reduced, target 1 (426) and target 2 (428) receive a higher percentage of total packets than each target previously did, and target 4 receives a correspondingly lower percentage of total packets, for the example of these FIGURES.

In the example illustrated by FIG. 6, the reassignment of two allocation buckets as a result of the change in target 4's weighting value causes disruption. The resulting disruption is approximately equal to (2×c)/n. In a situation where the allocation table change illustrated by FIG. 5 is followed by the allocation table change of FIG. 6, a total of four allocation buckets are reassigned—allocation bucket 6 (416), bucket 9 (419), bucket 10 (420), and bucket 11 (421). The dotted arrows 602, 604, 504, and 506 indicate changed bucket to target associations, and therefore, disruption. The total disruption is therefore approximately (4×c)/n. As discussed below, the present invention includes techniques for further reducing the amount of disruption related to multiple changes in weighting values.

Figure 7:
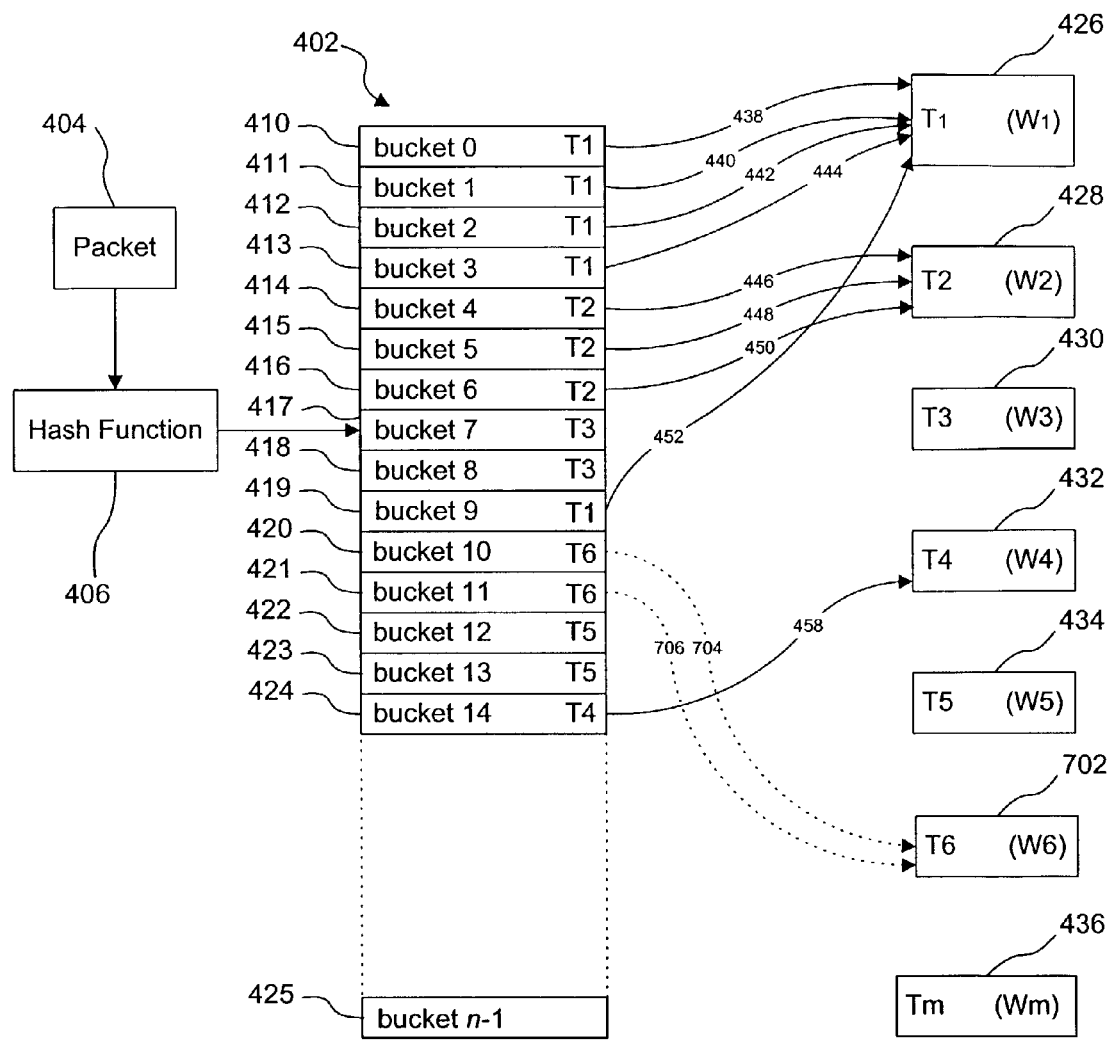
FIG. 7 illustrates the allocation table of FIG. 4 after targets have been added and deleted from the set of targets.

FIG. 7 illustrates an example wherein a new target 6 (702) is added, and the weighting value of target 4 (432) is reduced, and the allocation table 402 of FIG. 4 is modified as a result of both of these changes, in accordance with the present invention. In accordance with one embodiment of the invention, multiple changes in target weighting values can be combined and processed together, in order to minimize disruption.

For purposes of discussing FIG. 7, it is assumed that after target 6 (702) is added and the weighting value of target 4 (432) is reduced, aspects of the invention are employed to determine that two allocation buckets should be assigned to target 6, and that two allocation buckets should be reassigned from target 4. More specifically it is determined that two allocation buckets previously assigned to target 4 are to be reassigned to target 6, leaving one allocation bucket assigned to target 4. A discussion of how these determinations are made will be provided below.

As illustrated in the example of FIG. 7, by comparison with FIG. 4, allocation bucket 10 (420) and allocation bucket 11 (421) are reassigned to target 6 (702), as indicated by the dotted arrows 704 and 706, respectively. Allocation bucket 14 (424) is left unchanged, pointing to target 4.

In the example illustrated by FIG. 7, the reassignment of two allocation buckets as a result of the addition of target 6 (702) and the change in target 4's weighting value causes disruption. The resulting disruption is approximately equal to (2×c)/n. Note that as illustrated in FIGS. 5 and 6, processing the changes to target 4 and target 6 separately resulted in a change of four allocation buckets, and a disruption approximately equal to (4×c)/n. By combining the changes to the two targets, and processing the changes together, there is less disruption.

Figure 8:
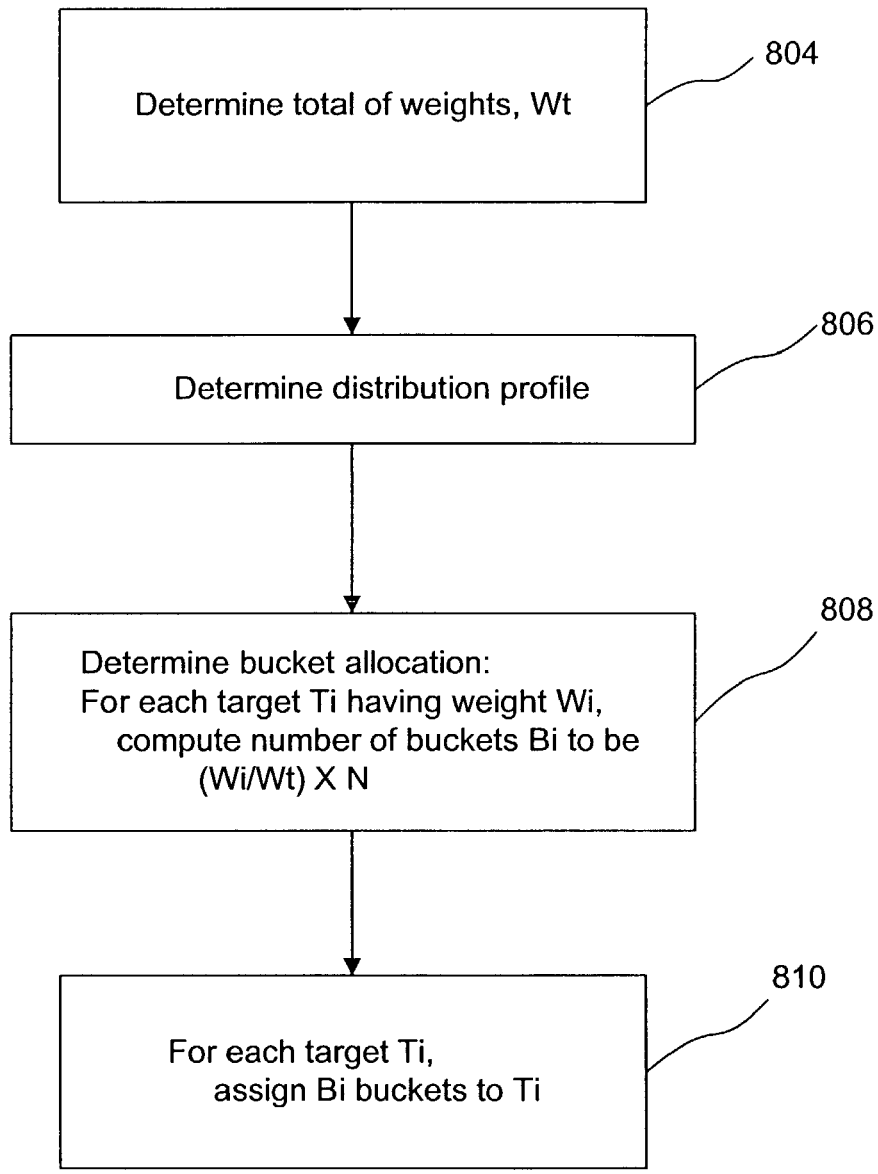
FIG. 8 is a flow chart illustrating a process for assigning buckets to targets, in accordance with the present invention.

FIG. 8 illustrates a process 802 for determining and assigning buckets to targets, in accordance with the present invention. Each target $T_i$ has a corresponding weighting value $W_i$. At a block 804, the process determines the total $W_t$ of all weighting values corresponding to the target set. At a block 806, the process determines a distribution profile of the target set. A distribution profile specifies the set of weighting values corresponding to each target, with an indication of the corresponding target. One way to represent a distribution profile is by an ordered set $\{W_1, W_2, W_3, \ldots W_m\}$, where m represents the number of targets, so that the distribution profile includes the weight of each target.

At a block 808, the process 802 determines a bucket allocation profile, which designates the number of buckets to be assigned to each target. In one embodiment, the bucket allocation profile is determined by computing, for each target $T_i$ having a weight $W_i$, a number of buckets $B_i$ to be approximately $(W_i/W_t) \times n$, where n represents the number of buckets in the allocation table. If the result of the calculation is not a whole number, a rounding operation is performed in order to obtain a whole number for each $B_i$.

The procedure of rounding to determine the bucket allocation profile can be performed in a number of ways. As an example, in one embodiment, rounding is performed in the following manner. Beginning at the first target, $T_1$, if $B_1$ is not a whole number, add a value delta, where $0<\text{delta}<1$, to $B_1$, such that $B_1+\text{delta}$ equals a whole number. This whole number becomes the rounded value for $B_1$. Then subtract the value delta from the next target's bucket number $B_2$. Using the new value for $B_2$, repeat the rounding step, with a new value delta, to find a whole number $B_2$ corresponding to target 2. This procedure is repeated until the last target is reached. When the last target $T_m$ is reached, the value $B_n$ should be a whole number. The bucket allocation profile can now be represented by the ordered set $\{B_1, B_2, \ldots B_m\}$, where each value $B_i$ represents the number of buckets to be assigned to the target $T_i$. In one embodiment, the number of buckets n is very high compared with the number of targets m, so that the amount of rounding for any target is a small percentage of the actual bucket allocation profile corresponding to the target.

At a block 810, each bucket is assigned to a corresponding target. In one embodiment, this assignment is performed by stepping through each target $T_i$, and assigning $B_i$ buckets to it, until each target has the appropriate number of buckets assigned to it, and each bucket is assigned to a target. In one embodiment, the allocation table is implemented as a table data structure, and assigning a bucket to a target is performed by storing the value of the target identifier in the table at the proper storage location of the bucket. The allocation table is one way of representing the assignments of each bucket to a corresponding target. Another way of representing the bucket assignments is by a set of sets. Each target has a corresponding set of buckets assigned to it. As used herein, the term "bucket assignments" refers to the assignments of all buckets in the allocation table.

Figure 9:
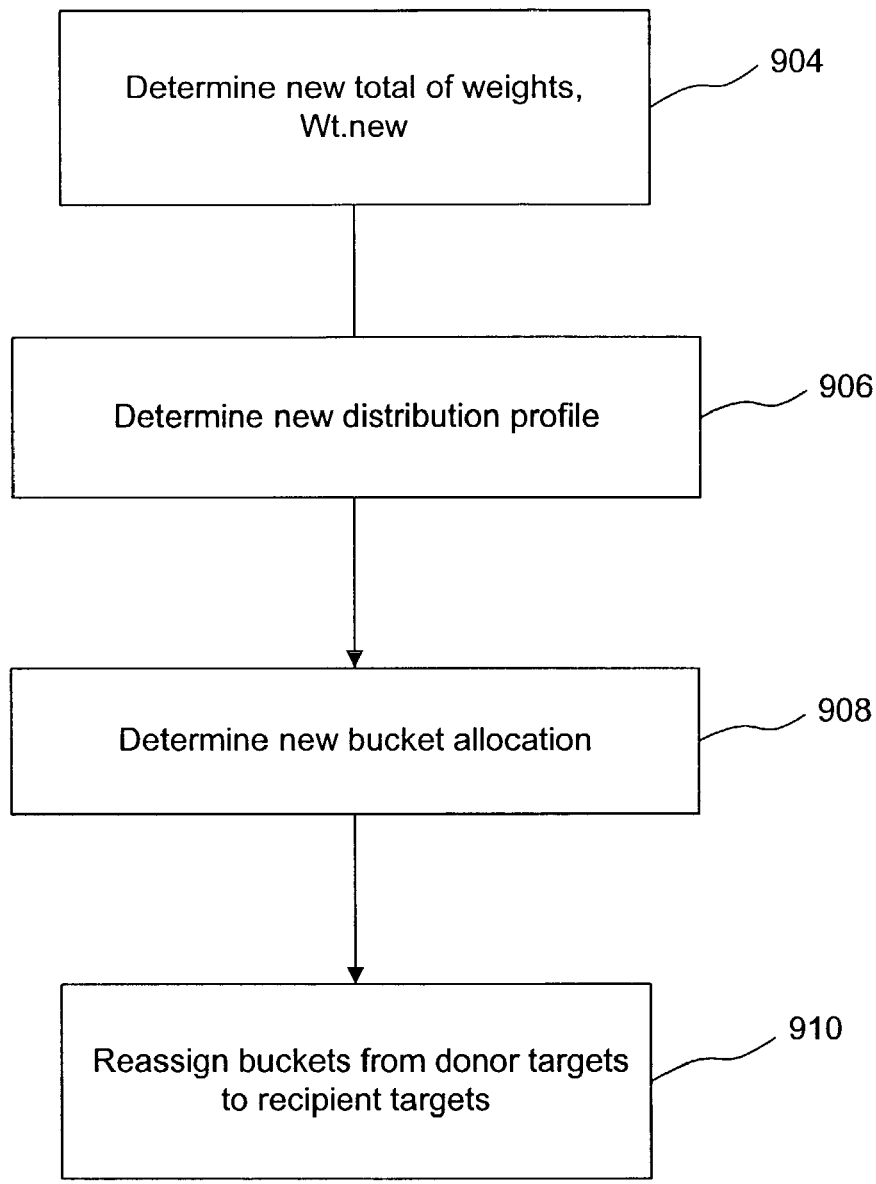
FIG. 9 is a flow chart illustrating a process for reassigning buckets to targets, after a change, in accordance with the present invention.

FIG. 9 illustrates a process 902 for determining and reassigning buckets to targets after one or more changes in weighting values corresponding to targets, in accordance with the present invention. After the change is detected, each target $T_i$ has a corresponding new weighting value $W_{i.\text{new}}$. The weighting value corresponding to a target $T_i$ prior to the change is represented as $W_{i.\text{old}}$.

At a block 904, the process determines the total $W_{t.\text{new}}$ of all new weighting values corresponding to the target set. At a block 906, the process determines a new distribution profile $\{W_{1.\text{new}}, W_{2.\text{new}}, W_{3.\text{new}}, \ldots W_{m.\text{new}}\}$ of the target set.

At a block 908, the process 902 determines a new bucket allocation profile, which designates the number of buckets to be assigned to each target. The action of determining a new bucket allocation profile is illustrated in further detail in FIG. 10, and discussed below.

At a block 910, each of zero or more buckets is reassigned to a different target, so that the new bucket allocation profile table representing the new bucket assignments is achieved. If the result of determining the new bucket allocation profile is such that no buckets are to be reassigned, then zero buckets are reassigned at the block 910. The action of reassigning buckets is illustrated in further detail in FIG. 11, and discussed below.

FIG. 10 illustrates, in further detail, the process of block 908, determining a new bucket allocation profile. At a block 1002, the number of buckets to be assigned to each target following the allocation table modification is determined. In one embodiment, this is performed by determining, for each target $T_i$, having a new weight $W_{i.\text{new}}$, the number of buckets $B_{i.\text{new}}$ to be approximately $$(W_{i.\text{new}}/W_{t.\text{new}}) \times n$$

where n is the number of buckets in the allocation table. For some number of targets, the value $W_{i.\text{new}}$ may equal $W_{i.\text{old}}$. That is, the weighting value has not changed. The number of buckets $B_{i.\text{new}}$ is calculated for these targets, nonetheless, since a change in the total weighting value, $W_{t.\text{new}}$, may result in a different number of buckets for targets that do not change.

The action of determining the number of buckets to be assigned to each target includes the use of a rounding operation in order to obtain a whole number for each $B_{i.\text{new}}$. A process of rounding was discussed above, with reference to FIG. 8. Additionally, the process of rounding, when performed during a modification to the allocation table, may include actions to further minimize disruption. The values of $B_{i.\text{new}}$ may be selected to reduce the number of buckets that are changed.

At a block 1004, for each target, the change in the number of buckets assigned to it is determined. In one embodiment, this is performed by calculating $$B_{i.\text{delta}} = B_{i.\text{new}} - B_{i.\text{old}},$$

such that for all targets $T_i$ having a corresponding $B_{i.\text{delta}} > 0$, the number of buckets corresponding to target $T_i$ will increase. Similarly, for all targets $T_i$ having a corresponding $B_{i.\text{delta}} < 0$, the number of corresponding buckets will decrease.

In accordance with the present invention, after modifying the allocation table, the disruption, will be approximately $$\text{disruption} = \frac{\sum |B_{i.\text{delta}}|}{2 \times n}$$

That is, the sum of the absolute values of all negative $B_{i.\text{delta}}$'s equals the sum of all positive $B_{i.\text{delta}}$'s, which equals the number of buckets to be reassigned. Dividing the buckets to be reassigned by the total number of buckets, n, results in the percentage of disruption.

It should be noted that, in some cases, the weighting value of a particular target may increase, while the new number of buckets corresponding to the particular target decreases, due to weighting value increases by one or more other targets, and a resultant increase in the total weighting value. Similarly, the number of buckets assigned to a target may increase, even though the weighting value of the target has decreased.

Figure 11:
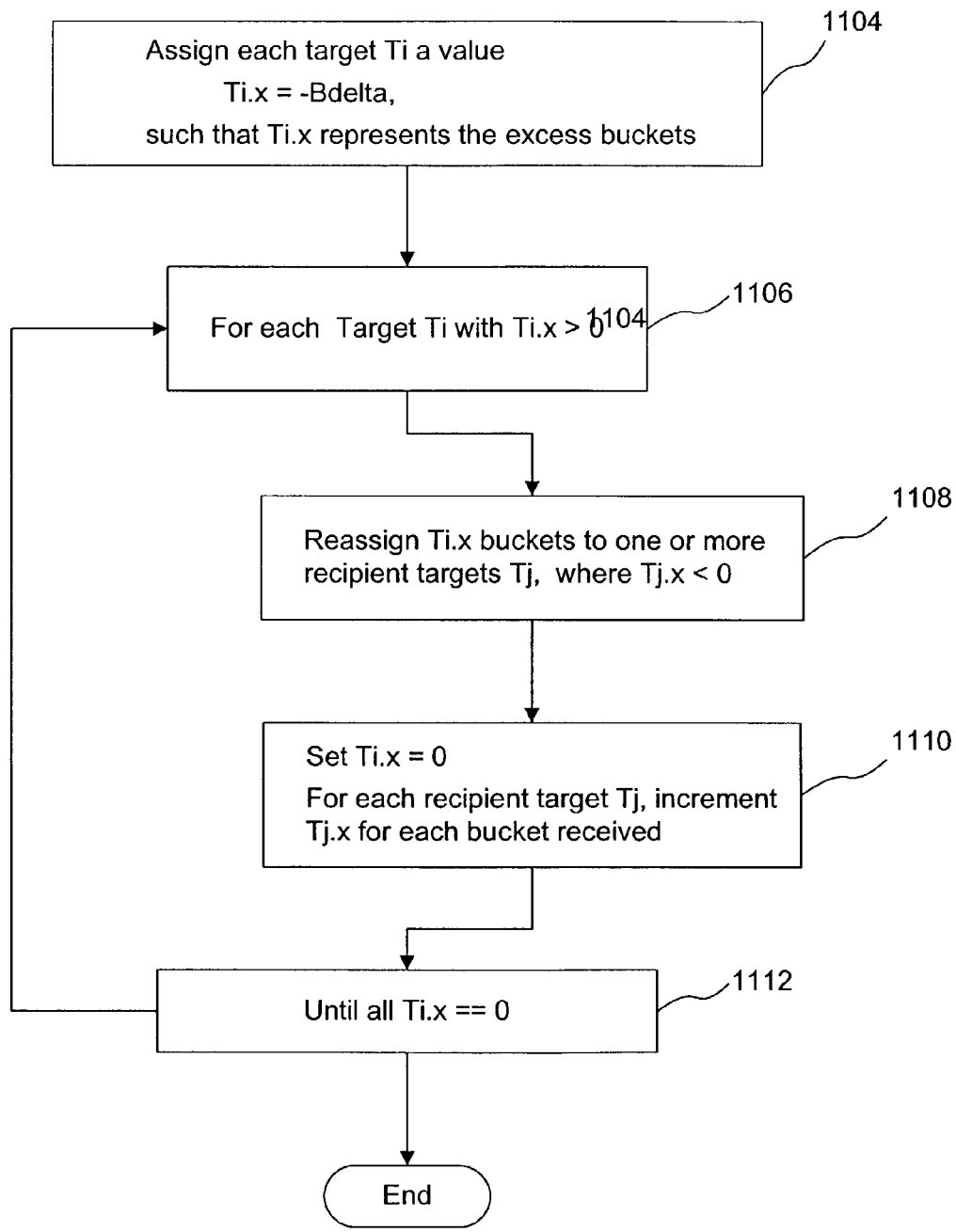
FIG. 11 is a flow chart illustrating, in further detail, the process of FIG. 9.

FIG. 11 illustrates, in further detail, the process of block 910 (FIG. 9), of reassigning buckets from donor targets to recipient targets. Donor targets are simply the set of targets having a negative $B_{i.\text{delta}}$, and thus having one or more buckets that will be reassigned from it. Recipient targets are the set of targets having a positive $B_{i.\text{delta}}$, and thus having one or more buckets that will be reassigned to it.

At a block 1104, each target $T_i$ is assigned a value $T_{i.x}$, where $$T_{i.x} = (-1) \times B_{i.\text{delta}}$$

The value $T_{i.x}$ is a dynamic value that represents the number of excess buckets assigned to the target $T_i$, during the process 910. At a block 1106, the process begins a loop, iterating for each target $T_i$ having a value $T_{i,x}>0$.

At a block 1108, within the loop, for a target $T_i$ having a positive value $T_{i,x}$, a number $T_{i,x}$ buckets are reassigned to one or more targets $T_j$ having a value $T_{i,x}<0$. In other words, buckets are reassigned from a donor target to one or more recipient targets. The reassignment is performed so that a recipient target $T_j$ having a value $T_{i,x}<0$ is not assigned more than $T_{i,x}$ new buckets.

At a block 1110, the value $T_{i,x}$ corresponding to the donor recipient $T_i$ just processed, is set to zero. This indicates that the target $T_i$ currently has its correct allocation of buckets assigned to it. For each recipient target $T_j$ that received at least one bucket from the target $T_i$, the value of $T_{j,x}$ is incremented by one for each bucket received.

At a block 1112, the loop begun at the block 1106 is evaluated to determine if there are any remaining targets left to be processed. If all targets have a corresponding value $T_{i,x}$ equal to zero, this indicates that all buckets have been reassigned as necessary. If there is remaining processing, the process 910 loops back to the block 1106 to begin processing the next donor target. If the processing is completed, the flow proceeds to the End terminator.

One of the aspects of the reassignment of buckets illustrated by FIG. 11 is that the disruption is kept to a minimum. For each donor target having an excess of buckets, only the excess number of buckets are reassigned. Remaining buckets remain assigned to the donor target. Similarly, none of the buckets assigned to recipient targets are reassigned. As discussed above, the resultant disruption is therefore limited to the excess buckets. Following are some special cases of the processing described above that may occur.

In one case, a target $T_d$ is deleted, and no other changes in weighting values occur. In this case, the new distribution profile is $\{W_1, W_2, \ldots, W_{d-1}, W_{d+1}, \ldots W_m\}$. We could also include a zero value for $W_d$ in the profile and have the same result. The number of buckets assigned to the deleted target that need to be reassigned is $$(W_d/W_{t,old}) \times n.$$

The number of buckets reassigned to each target $T_i$ is approximately $$(W_i/(W_{t,old}-W_d)) \times (W_d/W_{t,old}) \times n.$$

In another case, a target $T_a$ is added, and no other changes in weighting values occur. In the case, a number $(W_a/(W_{t,new})) \times n$ of buckets are reassigned from their original targets to the new target $T_a$.

Figure 12:
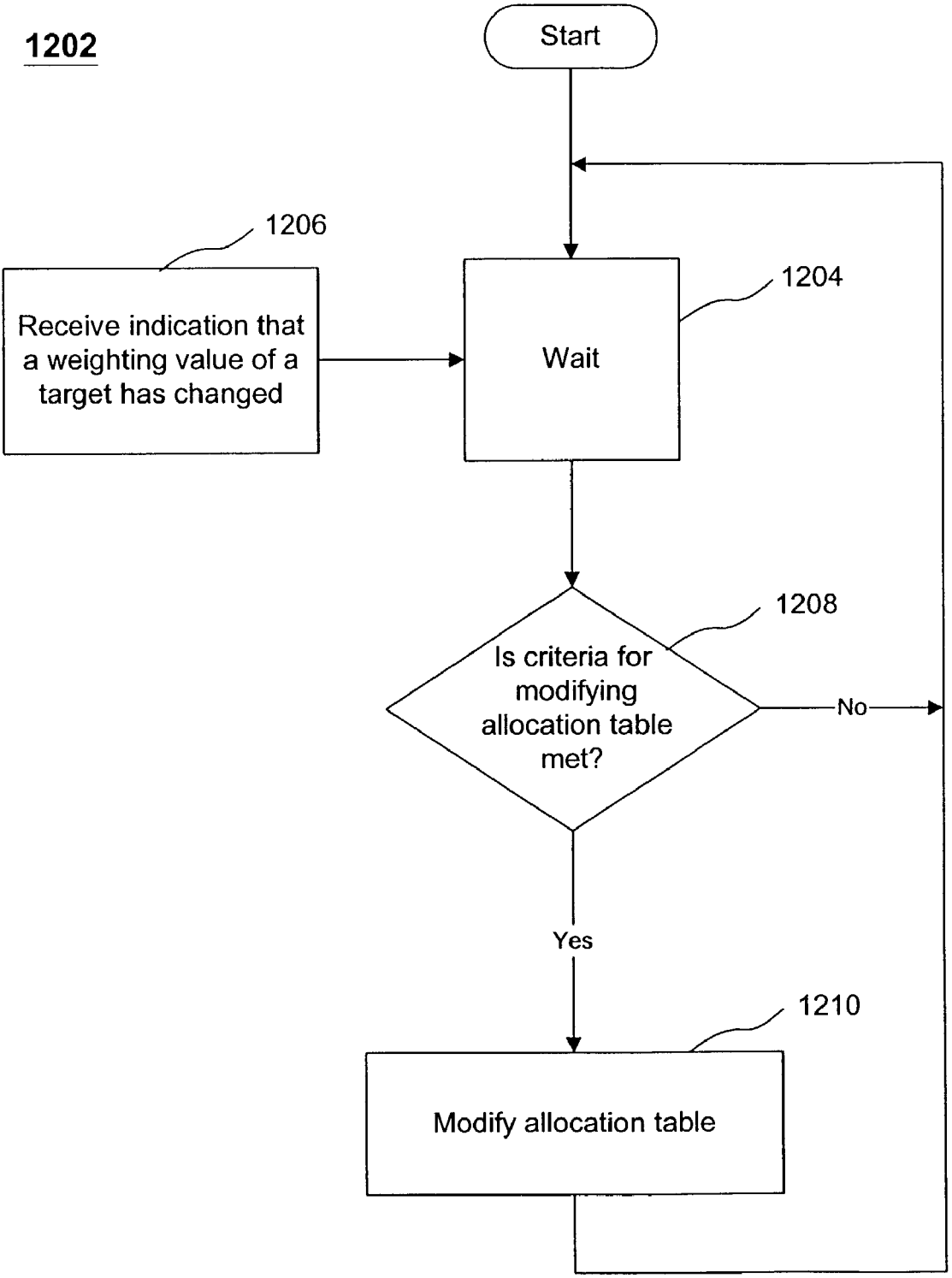
FIG. 12 is a flow chart illustrating a process for combining multiple changes when modifying an allocation table.

FIG. 12 illustrates a process 1202 for determining when to modify an allocation table in accordance with the present invention. In one embodiment, a network device practicing the invention receives a notification, such as an interrupt or a message, when a weighting value of a target changes. In one embodiment, a network device periodically polls to determine whether any weighting value has changed since the previous poll. In either situation, it may be desirable to delay reassignment of allocation buckets, so as to reduce disruption. As discussed above, combining multiple weighting value changes can result in less disruption, as compared with performing separate reassignments for each weighting value change. In some situations, multiple weighting value changes may even partially or completely cancel each other out. For example, a particular network device or path may temporarily reduce its weighting value by a small amount. By postponing the process of modifying the allocation table, disruption can be avoided without a significant loss of efficiency.

In the process 1202, after a start block, at a block 1204, the process waits for a period of time. This period of time could be a variety of lengths, including zero time. On some iterations, this may be an indefinite period of time. For example, if there is not an indication that a weighting value has changed, the process may wait at the block 1204 for an indefinite period of time.

At a block 1206, the process receives an indication that at least one weighting value of at least one target value has changed, thereby determining that a weighting value has changed. As discussed above, this determination can be made in a number of manners, including polling and receiving signals. Making this determination brings the process out of waiting block 1204. Alternatively, the expiration of the waiting time period also brings the process out of waiting block 1204.

At a decision block 1208, a decision is made as to whether a criteria for modifying the allocation table has been met. If the criteria has not been met, the process loops back to the waiting block 1204 and, waits a period of time. The waiting period may be different each time that the process enters the waiting block 1204, including the possibility of a waiting time of zero. The waiting period may be a function of the results of the criteria reviewed in the decision block 1208. For example, if the factors considered are close to meeting the criteria, the waiting time may be shorter than when the factors are not close to meeting the criteria. In one embodiment, one of the criteria considered at the block 1206 is the length of time since a recent weighting value change. In this embodiment, the decision at the decision block 1208 may be positive on an iteration of the loop, even though no additional weighting value changes have occurred.

If, at the decision block 1208, it is determined that the criteria has been met, at a block 1210, the allocation table 402 (FIG. 4) is modified, in accordance with the teachings of the present invention.

By employing certain criteria in the process 1202, a device practicing the invention may reduce disruption or processing time. Following are some factors that may be used in the practice of the invention. In one embodiment, evaluating each factor results in a score for the factor, and the overall criteria determination uses the combined score for the set of factors. In one embodiment, each factor is represented by a rule, and the criteria is met if any rule is met. Many of the rules have one or more associated thresholds. For example, in the first rule, a weighting value or bucket allocation change of less than 10% may result in a score of 1, a change of 10%-25% may result in a score of 2, etc., where a designated total score triggers an allocation table modification. The criteria may include any combination of one or more of the following, or other factors. The criteria may also include factors that are derived from these factors.

1. Magnitude of weighting value/bucket allocation change of the first network path. This may be absolute change, weighting value change relative to the total of weighting values, or relative to the previous weighting value of the first network path. A bucket allocation is the number of buckets allocated to a target, as indicated in the bucket allocation profile.
2. Direction of weighting value/bucket allocation change of the first network path. For example, a decrease in weighting value/bucket allocation is more urgent than an increase in weighting value/bucket allocation, and may trigger a reassignment earlier than an increase of equal magnitude.

3. Whether the first network path weighting value/bucket allocation changed to approximately zero.
4. The amount of traffic on each network path.
5. The total amount of traffic on all network paths.
6. The amount of traffic on each network path relative to a capacity of each network path. In one embodiment, a relatively low amount of traffic indicates a lower need to modify the allocation table, because the network paths are sufficiently handling the traffic. In one embodiment, a relatively low amount of traffic indicates a better time to modify the allocation table, because it may result in less total disruption than when traffic is heavy.
7. The weighting value/bucket allocation of each network path relative to its optimal weighting value/bucket allocation. In one embodiment, a heavily loaded network path indicates a factor in favor of modifying the allocation table.
8. The target weighting value/bucket allocation changes relative to total of all weighting value/bucket allocations.
9. The weighting value/bucket allocation changes of a plurality of network paths.
10. Patterns of weighting value changes among the targets. For example, if fluctuations are frequent within a normal range, and weighting values that change usually change in the opposite direction within a short period of time, it may be desirable to wait longer before changing the allocation table.

In one embodiment, the action at the block 1208, of determining whether the criteria for modifying the allocation table is met, includes at least part of the actions of blocks 904, 906, and 908 of FIG. 9, that is, determining a new total of weights, determining a new distribution profile, and determining a new bucket allocation profile. Any one or more of these actions may be included. Note that in the exemplary rules listed above, either weighting values or bucket allocation profiles can be used as the unit of measurement.

In one embodiment, the invention includes an interface for receiving instructions that specify one or more of the criteria for modifying the table. The interface can allow one or more messages to be sent from a remote device to the network device performing actions of the invention. The messages may include a specification of which rules to use. The messages may include threshold values that are used in conjunction with the criteria. Received messages can also override the criteria indefinitely, or for a designated time period. For example, if a series of changes in weighting value are expected, a message can be sent to the network device with instructions to suspend modification of the allocation table for a designated period of time. A message can also be sent with instructions to raise (or lower) the thresholds for the designated period of time, so that only critical weighting value changes (such as a deleted target server) cause a change in the allocation table.

The above specification, examples and data provide a complete description of the manufacture and use of the composition of the invention. Since many embodiments of the invention can be made without departing from the spirit or scope of the invention, the invention resides in the claims hereinafter appended.

What is claimed is:

1. A method of associating allocation buckets in an allocation table with corresponding target identifiers from a set of target identifiers, each target identifier having a corresponding weighting value, the set of target identifiers having a distribution profile based on weighting values of each target identifier, the method implemented on one or more computers, comprising:
   (a) creating an allocation table having a number n of allocation buckets;
   (b) creating an association between each allocation bucket and a corresponding target identifier, based on the distribution profile; and
   (c) if at least one target identifier's corresponding weighting value changes:
      (i.) determining a new bucket allocation profile based at least in part on the weighting value changes;
      (ii.) determining whether to wait for a subsequent weighting value change, based at least in part on the change in the weighting value corresponding to the first target object;
      (iii.) modifying an association corresponding to at least one allocation bucket, based on the new bucket allocation profile; and
      (iv.) if the determination whether to wait is affirmative, waiting for the subsequent weighting value change, prior to modifying the association corresponding to the at least one allocation bucket.

2. The method of claim 1, further comprising:
   (a) prior to the creating the associations, determining a first bucket allocation profile based on the distribution profile, the first bucket allocation profile indicating a number of buckets that is to correspond to each of the target identifiers; and
   (b) modifying associations corresponding to at least one allocation bucket that are assigned to at least one target identifier having a decrease in the corresponding number of buckets from the first bucket allocation profile to the new bucket allocation profile.

3. The method of claim 2, the modifying comprising reassigning said allocation buckets assigned to target identifiers having a decrease in their corresponding number of buckets, so that they are reassigned to target identifiers having an increase in their corresponding number of buckets from the first bucket allocation profile to the new bucket allocation profile.

4. The method of claim 1, further comprising:
   (a) prior to the creating the associations, determining a first bucket allocation profile based on the distribution profile, the bucket allocation profile indicating a number of buckets corresponding to each of the target identifiers; and
   (b) modifying associations corresponding to at least one allocation bucket, based on the new bucket allocation profile and the first bucket allocation profile.

5. The method of claim 1, further comprising:
   (a) prior to the creating the associations, determining a first bucket allocation profile based on the distribution profile, the bucket allocation profile indicating a number of buckets corresponding to each of the target identifiers; and
   (b) modifying associations corresponding to at least one allocation bucket, based on the new bucket allocation profile and the association between each allocation bucket and a corresponding target identifier prior to the at least one target identifier's corresponding weighting value change.

6. The method of claim 1, further comprising:
(a) prior to the creating the associations, determining a first bucket allocation profile based on the distribution profile, the bucket allocation profile indicating a number of buckets corresponding to each of the target identifiers; and
(b) modifying substantially only associations corresponding to allocation buckets that are assigned to target identifiers having a decrease in the corresponding number of buckets from the first bucket allocation profile to the new bucket allocation profile.

7. The method of claim 6, the modifying comprising reassigning said allocation buckets assigned to target identifiers having a decrease in their corresponding number of buckets, so that they are reassigned to target identifiers having an increase in their corresponding number of buckets from the first bucket allocation profile to the new bucket allocation profile.

8. The method of claim 6, further comprising for each target identifier, modifying a number of associated buckets approximately equal to a decrease in the corresponding number of buckets.

9. The method of claim 1, wherein the determining the new bucket allocation profile comprises determining, for each target $T_i$ having a corresponding weighting value $W_i$, a desired number of buckets to be approximately $(W_i/W_{total})*n$, where $W_{total}$ represents a total weighting value of weighting values corresponding to all target identifiers.

10. The method of claim 1, wherein modifying the association corresponding to the at least one allocation bucket comprises modifying associations so that at least one target identifier has a set of corresponding allocation buckets that are not contiguous.

11. The method of claim 1, further comprising if the total weighting value of all target identifiers does not increase, modifying only associations of allocation buckets associated with a target identifier having a decrease in weighting value.

12. The method of claim 1, wherein the at least one target identifier having a corresponding weighting value change comprises at least one increasing target identifier having a corresponding increase in weighting value, further comprising if the total weighting value of all target identifiers does not decrease, reassigning at least one allocation bucket such that substantially all the reassigned allocation buckets are reassigned to one or more of the at least one increasing target identifiers.

13. The method of claim 1, further comprising when a weighting value corresponding to exactly one target identifier $t_k$ increases, reassigning at least one allocation bucket to correspond to the target identifier $t_k$, and not modifying associations of allocation buckets other than the at least one allocation bucket reassigned to the target identifier $t_k$.

14. The method of claim 13, further comprising determining a number $B_{k.delta}$ of buckets to be reassigned to correspond to the target identifier $t_k$, wherein $B_{k.delta}$ is approximately $(W_{k.new}/W_{total.new} - W_k/W_{total}) \times n$, where $W_{k.new}$ is the weighting value corresponding to the target identifier $t_k$ after the weighting value change, $W_{total.new}$ is a total of all weighting values after the weighting value change, $W_k$ is a weighting value corresponding to the target identifier $t_k$ before the weighting value change, and $W_{total}$ is a total of all weighting values before the weighting value change.

15. The method of claim 1, wherein each target identifier has a corresponding weighting ratio that is a fraction of the target identifier's corresponding weighting value divided by a total weighting value of all target identifiers, further comprising:
(a) determining that at least one weighting value has changed such that a first set of at least one target identifier has corresponding decreases in weighting ratios, and a second set of at least one target identifier has corresponding increases in weighting ratios; and
(b) modifying substantially only associations of allocation buckets corresponding to at least one target identifier in the first set of target identifiers.

16. The method of claim 15, further comprising modifying substantially all of said substantially only associations of allocation buckets to be assigned to at least one target identifier in the second set of target identifiers.

17. A method of routing packets along a plurality of paths in a network, each path having a weighting value, the method implemented on one or more computers, comprising:
(a) assigning a target identifier to each path, each path weighting value corresponding to the target identifier weighting value;
(b) hashing on at least one characteristic of each packet to obtain a corresponding allocation bucket; and
(c) employing the method of claim 1 to determine a path for each packet after a path's weighting value changes.

18. The method of claim 17, further comprising if at least a first path's weighting value changes, determining whether to wait prior to modifying the allocation table, the determining whether to wait based at least in part on the change in weighting value of the first path.

19. The method of claim 18, wherein the determining whether to wait comprises determining whether to wait based on at least one of the amount of traffic on one or more of the network paths, a magnitude of weighting value change of the first network path, a total weighting value of a plurality of network paths, and a prior history of weighting value changes.

20. The method of claim 17, further comprising if at least a first path's weighting value changes, determining whether to wait prior to modifying the allocation table, the determining whether to wait based at least in part on a change in bucket allocation profile of the first path.

21. A method of distributing packets over a network having a plurality of network devices, each network device having a weighting value, comprising:
(a) receiving at least one packet, each packet to be forwarded to one of the plurality of network devices;
(b) for each packet, creating a hash value based on at least one characteristic of the packet;
(c) employing the method of claim 1 to maintain an association between each hash value and a corresponding network device, based on the weighting value corresponding to each network device; and
(d) forwarding each of the at least one packets to a target network device based on the association of the hash value corresponding to the packet.

22. The method of claim 21, wherein modifying the association corresponding to the at least one allocation bucket comprises modifying associations so that at least one target identifier has a set of corresponding allocation buckets that are not contiguous.

23. The method of claim 21, further comprising:
(a) determining that a weighting value corresponding to a first network device has changed; and (b) waiting until a weighting value corresponding to a second network device has changed, prior to modifying an association corresponding to the first network device.

24. The method of claim 21, wherein the plurality of network devices comprise intermediate network devices on a path between a client device and at least one server, and receiving at least one packet comprises receiving at least one client packet from the client device, further comprising:
   (a) receiving at least one server packet from the at least one server;
   (b) for each server packet, creating a hash value based on at least one characteristic of the server packet; and
   (c) forwarding each of the at least one server packets to one of the intermediate network devices based on the hash value based on the at least one characteristic of the server packet, such that client packets and server packets within a flow of packets are forwarded to the same intermediate network device.

25. A method of routing packets along a plurality of paths in a network, each network path having a corresponding weighting value, the method implemented on one or more computers, comprising:
   (a) maintaining a database that includes data for mapping packets and network paths, according to each path's corresponding weighting value;
   (b) when a first weighting value corresponding to a first network path changes, determining whether to wait until a subsequent change of a second weighting value, the determining whether to wait based at least in part on the change in the first weighting value;
   (c) modifying the database based at least on the change in the first weighting value; and
   (d) if the determining whether to wait is affirmative, waiting at least until the subsequent change of the second weighting value prior to the modifying the database.

26. The method of claim 25, wherein the determining whether to wait includes determining whether a specified criteria has been reached, the criteria comprising at least one factor from a set of factors comprising magnitude of the first weighting value change, direction of the first weighting value change, whether the first weighting value change resulted in a weighting value close to zero, an amount of traffic on each network path, a total amount of traffic on all network paths, an amount of traffic on each network path relative to a capacity of each network path, a weighting value of each network path relative to its optimal weighting value, the magnitude of the first weighting value change relative to a total of weighting values, and weighting value changes of a plurality of network paths.

27. The method of claim 25, further comprising receiving a message from a remote device, the message including data and/or instructions specifying criteria for modifying the database.

28. The method of claim 25, further comprising receiving one or more messages from a remote device, the one or more messages including data and/or instructions specifying criteria for modifying the database and a designation that the specified criteria are to be used for a limited time period.

29. A computer storage medium having computer program logic stored therein, the computer program logic when executed by a computer enables actions, comprising:
   (a) determining a first bucket allocation profile based on the weighting value of each target object, the first bucket allocation profile indicating a number of buckets corresponding to each of the target identifiers;
   (b) creating an allocation table having a number of buckets, each bucket having an associated target object, each target object having a corresponding weighting value, each target object having a number of associated buckets, based on the bucket allocation profile; and
   (c) if at least one target identifier's corresponding weighting value changes:
      (i.) determining a new bucket allocation profile based at least in part on the changed weighting value changes;
      (ii.) determining whether to wait for a subsequent weighting value change, based at least in part on the change in the weighting value;
      (iii.) modifying at least one association corresponding to at least one allocation bucket, based on the new bucket allocation profile and the bucket associations prior to the weighting value change; and
      (iv.) if the determining whether to wait is affirmative, waiting for the subsequent weighting value change, prior to modifying the association corresponding to the at least one allocation bucket.

30. The computer program product of claim 29 the computer program logic further comprising if the at least one target identifier's corresponding weighting value changes, for each target identifier having a decrease d in buckets from the first bucket allocation profile to the second allocation, modifying approximately d bucket associations corresponding to the target identifier.

31. A network device for forwarding network packets to a plurality of targets in a network, each target having a weighting value, the set of targets having a distribution profile based on weighting values of each target comprising:
   (a) computer executable instructions that create an allocation table having a number n of allocation buckets, each allocation bucket having a corresponding target, based on the distribution profile;
   (b) means for modifying the allocation table when the distribution profile changes due to at least one weighting value change, so that the number of buckets corresponding to each target after the table modification is based on the changed distribution profile, wherein the modification means enables further actions comprising:
      (i) determining a bucket allocation profile indicating a number of buckets to be assigned to each path, based on the distribution profile; and
      (ii) determining a set of buckets to be reassigned, based on a difference between a bucket allocation profile after the distribution profile changes and a bucket allocation profile before the distribution profile changes; and
   (c) a packet forwarding mechanism that forwards each incoming packet to one of the plurality of targets, based on the allocation table.

32. The network device of claim 31, the means for determining the set of buckets to be reassigned comprising:
   (a) computer executable instructions that determine a set of changing buckets from each target having a corresponding decrease in a number of corresponding buckets based on the bucket allocation profile after the distribution profile changes and the bucket allocation profile before the distribution profile changes, each set of changing buckets based on the corresponding decrease; and
   (b) computer executable instructions that reassign the buckets within each set of changing buckets.

33. A method of dynamically associating source objects with target objects, each target object having a corresponding weighting value, the method implemented on one or more computers, comprising:
- (a) maintaining an allocation table having a number n of allocation buckets, each allocation bucket having an associated target object, wherein the number of allocation buckets is greater than the number of target objects;
- (b) hashing on values associated with source objects to create hash values, using a hash algorithm;
- (c) determining target objects associated with each source object, using the hash values and the allocation table; and
- (d) if a weighting value corresponding to a first target object increases:
  - (i.) determining a number d of allocation buckets to reassign to the first target, based on an amount of weighting value increase corresponding to the first target object;
  - (ii.) selecting a set of approximately the number d of allocation buckets to be reassigned, based at least partly on the associations of each target object prior to the weighting value change;
  - (iii.) determining whether to wait for a subsequent weighting value change, based at least in part on the change in the weighting value corresponding to the first target object;
  - (iv.) reassigning the set of allocation buckets to the first target object; and
  - (v.) if the determining whether to wait is affirmative, waiting for the subsequent weighting value change, prior to reassigning the set of allocation buckets to the first target object.

34. The method of claim 33, wherein the first target has a prior set of associated allocation buckets prior to the weighting value increase, and the set of approximately the number d of allocation buckets is not contiguous with the prior set of associated allocation buckets.

35. A method of associating allocation buckets in an allocation table with corresponding target identifiers from a set of target identifiers, each target identifier having a corresponding weighting value, the method implemented on one or more computers, comprising:
- (a) creating an allocation table having a number n of allocation buckets, n being greater than the number of target identifiers;
- (b) determining a first bucket allocation profile that designates, for each target identifier, a number of allocation buckets to be assigned to it, such that the number of allocation buckets assigned to a target identifier is based on a weighting value corresponding to the target identifier;
- (c) creating an association between each allocation bucket and a corresponding target identifier, based on the bucket allocation profile; and
- (d) if at least one target identifier weighting value changes, modifying the allocation table, the modifying comprising:
  - (i.) determining a second bucket allocation profile;
  - (ii.) identifying a set of buckets to modify, based on the second bucket allocation profile and the first bucket allocation profile, such that the set of buckets comprises approximately a minimum number of buckets that must be modified to provide each changed target identifier with approximately a number of corresponding allocation buckets designated by the second bucket allocation profile; and
  - (iii.) modifying the association of each bucket in the set of buckets, based on the second bucket allocation profile.

36. The method of claim 35, the modifying the allocation table further comprising modifying the allocation table such that at least one target identifier has a set of assigned allocation buckets that are not contiguous.

37. The method of claim 35, the identifying the set of buckets to modify comprising:
- (a) determining, for each target identifier a number d, representing approximately a difference between a number of buckets corresponding to the target identifier in the second bucket allocation profile, and a number of buckets corresponding to the target identifier in the first bucket allocation profile; and
- (b) identifying, for each target identifier having a positive number d, d buckets that are associated with the target identifier, for inclusion in the set of buckets to modify.

* * * * *

UNITED STATES PATENT AND TRADEMARK OFFICE
CERTIFICATE OF CORRECTION

PATENT NO. : 7,355,977 B1
APPLICATION NO. : 10/222108
DATED : April 8, 2008
INVENTOR(S) : Li It is certified that error appears in the above-identified patent and that said Letters Patent is hereby corrected as shown below:

Drawing sheet 11 of 12, in Fig. 11 (Reference Numeral 1106), line 1, delete "$Ti.x > 0104$" and insert -- $Ti. \times > 0$ --, therefor.

In column 11, line 42, after "buckets" insert -- – --.

In column 13, line 13, after "m" delete ")," and insert -- }, --, therefor.

In column 14, line 39, after "$\frac{\sum\{B.sub.i.delta\}}{2 \times n}$" insert -- . --.

In column 14, line 64, after "(-1) X B.sub.i.delta" insert -- . --.

In column 15, line 6, delete "T.subj" and insert -- T.sub.j --, therefor.

In column 15, line 9, delete 'T.subj" and insert -- T.sub.j --, therefor.

In column 15, line 16, delete "T.subj" and insert -- T.sub.j --, therefor.

Signed and Sealed this

Twenty-sixth Day of May, 2009

JOHN DOLL
*Acting Director of the United States Patent and Trademark Office*